United States Patent
Arai et al.

(10) Patent No.: US 9,571,002 B2
(45) Date of Patent: Feb. 14, 2017

(54) VOLTAGE ADJUSTING APPARATUS

(71) Applicant: Kabushiki Kaisha Toshiba, Minato-ku (JP)

(72) Inventors: Takuro Arai, Kokubunji (JP); Hiroshi Mochikawa, Hachioji (JP); Yuji Watanabe, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/698,972

(22) Filed: Apr. 29, 2015

(65) Prior Publication Data

US 2015/0333655 A1   Nov. 19, 2015

(30) Foreign Application Priority Data

May 16, 2014  (JP) ................ 2014-102669

(51) Int. Cl.
*H02M 7/217*  (2006.01)
*H02J 3/18*  (2006.01)

(52) U.S. Cl.
CPC ........... *H02M 7/217* (2013.01); *H02J 3/1814* (2013.01); *Y02E 40/18* (2013.01)

(58) Field of Classification Search
CPC .................................................. H02M 7/217
See application file for complete search history.

(56) References Cited

U.S. PATENT DOCUMENTS

| | | | | | |
|---|---|---|---|---|---|
| 5,029,285 | A | * | 7/1991 | Bobry | H02J 9/062 307/64 |
| 5,166,597 | A | * | 11/1992 | Larsen | G05F 1/20 323/215 |
| 5,469,044 | A | * | 11/1995 | Gyugyi | H02J 3/1814 307/105 |
| 5,734,257 | A | * | 3/1998 | Schauder | H02J 3/1814 307/105 |

(Continued)

FOREIGN PATENT DOCUMENTS

| | | |
|---|---|---|
| DE | 195 32 177 C1 | 1/1997 |
| JP | 2000-32665 A | 1/2000 |

(Continued)

OTHER PUBLICATIONS

Examination Report issued Sep. 30, 2015 in Australian Patent Application No. 2015202261.

(Continued)

*Primary Examiner* — Emily P Pham
(74) *Attorney, Agent, or Firm* — Oblon, McClelland, Maier & Neustadt, L.L.P.

(57) ABSTRACT

In a voltage adjusting apparatus connected in series to a system, an output of an AC/DC converter thereof is reduced. The apparatus includes a second serial transformer having a primary side connected in series to a secondary side of a first serial transformer having a primary side connected in series between a power supply and a load and to a secondary side of a parallel transformer having a primary side connected in parallel between the power supply and the load; and a first (Continued)

AC/DC converter having an AC side connected to a secondary side of the second serial transformer. The first AC/DC converter has a switching element connected between an AC terminal and a DC terminal, an antiparallel diode, and a capacitor.

8 Claims, 6 Drawing Sheets

(56) References Cited

U.S. PATENT DOCUMENTS

| | | | | |
|---|---|---|---|---|
| 6,900,619 | B2* | 5/2005 | Kehrli | H02J 3/1828 |
| | | | | 323/207 |
| 7,117,070 | B2* | 10/2006 | Chow | G05F 1/70 |
| | | | | 307/82 |
| 7,365,451 | B2 | 4/2008 | Aritsuka | |
| 7,813,884 | B2* | 10/2010 | Chu | H02J 3/06 |
| | | | | 307/98 |
| 2006/0229767 | A1 | 10/2006 | Chu et al. | |
| 2014/0191581 | A1* | 7/2014 | Inuzuka | H02J 3/00 |
| | | | | 307/80 |

FOREIGN PATENT DOCUMENTS

| | | |
|---|---|---|
| JP | 2003-70251 | 3/2003 |
| JP | 4272208 | 6/2009 |

OTHER PUBLICATIONS

Extended European Search Report issued Sep. 17, 2015 in Patent Application No. 15165419.1.

L. Gyugyi et al. "The Unified Power Flow Controller: A New Approach to Power Transmission Control", IEEE Transactions on Power Delivery, vol. 10, No. 2, 1995, 7 pages.

* cited by examiner

1

VOLTAGE ADJUSTING APPARATUS

CROSS-REFERENCE TO RELATED APPLICATION

This application is based upon and claims the benefit of priority from Japan Patent Application No. 2014-102669, filed on May 16, 2014, the entire contents of which are incorporated herein by reference.

TECHNICAL FIELD

Embodiments of the present invention relate to a voltage adjusting apparatus provided in a system.

DESCRIPTION OF THE RELATED ART

In a power system, a power receiving point voltage of a consumer needs to be kept constant. However, voltage fluctuation occurs due to impedance of the system. Normally, a voltage drop occurs due to the impedance of the system in proportion to a distance from a transformer substation and thus, a system voltage lowers. On the other hand, when power demand is low at nighttime, for example, a phenomenon that the system voltage rises due to a phase advancing capacitor connected to the system is reported.

In the recent years, a large number of distributed power supplies such as solar power generation and wind power generation are introduced so as to perform reverse power flows to the system, and a voltage rise or voltage fluctuation in an early cycle occur. In order to compensate for such voltage fluctuation, a voltage adjusting apparatus is used.

FIG. 12 illustrates a conventional voltage adjusting apparatus. This apparatus is called a UPFC (Unified Power Flow Controller) and is capable not only of suppressing voltage fluctuation but also of controlling a power flow. In FIG. 12, a serial transformer T1 having a primary winding connected in series between a power supply P and a load R, and a parallel transformer T2 having a primary winding connected in parallel to the load are provided, and an AC terminal of an AC/DC converter I is connected to secondary windings of the transformers T1 and T2, respectively.

DC terminals of the two AD/DC converters I are connected via a capacitor and have a so-called BTB (Back to Back) configuration. Here, assuming that a compensation voltage is Vc, a system voltage is Vs, and a system load capacity is Ps, an output Pc of the AC/DC converter I is expressed as follows:

$$P_c = \frac{|V_c|}{V_s} P_s$$

CITATION LIST

Patent Literatures

Patent Document 1: JP2003-70251 A

SUMMARY

Technical Problem

However, the AC/DC converter of the conventional voltage adjusting apparatus as above needs to have a capacity determined by the compensation voltage, the system line voltage, and the system load capacity. Thus, it leads to an increase in the output of the AC/DC converter and results in an increase in loss, size, complexity, and a cost of the voltage adjusting apparatus.

Embodiments of the present invention are proposed in order to solve the above-described problems of the conventional technology and have an object to reduce an output of the AC/DC converter in a voltage adjusting apparatus connected in series to the system.

Solution to Problem

A voltage adjusting apparatus, which is an embodiment of the present invention, is proposed in order to achieve the above-described object and includes: a second serial transformer having a primary side connected in series to a secondary side of a first serial transformer having a primary side connected in series between a power supply and a load and to a secondary side of a parallel transformer having a primary side connected in parallel between the power supply and the load; and an AC/DC converter having an AC side connected to a secondary side of the second serial transformer.

DESCRIPTION OF EMBODIMENTS

First Embodiment

Configuration

Figure 1:
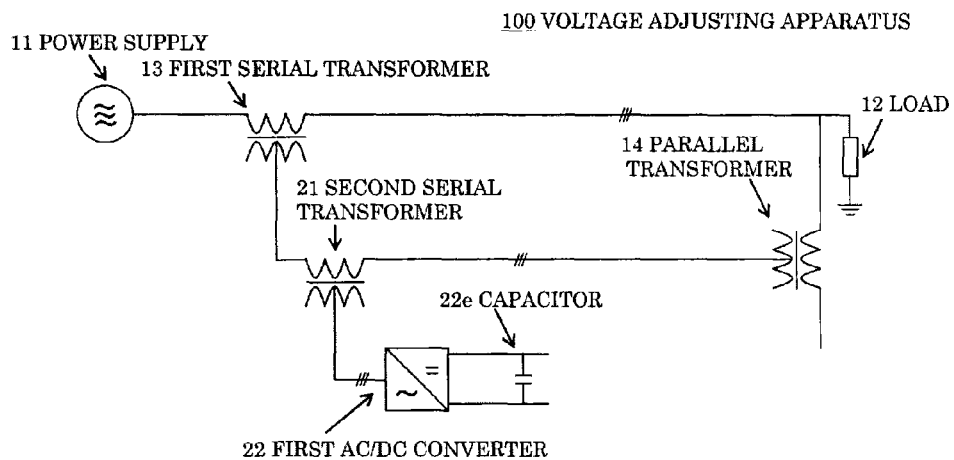
FIG. 1 is a configuration diagram illustrating a voltage adjusting apparatus of a first embodiment.

A configuration of this embodiment will be described with reference to FIGS. 1 and 2. A voltage adjusting apparatus 100 in this embodiment is an apparatus connected to a first serial transformer 13 and a parallel transformer 14 connected between a power supply 11 and a load 12 and has a second serial transformer 21 and a first AC/DC converter 22.

The power supply 11 is a system power supply of a three-phase alternating current. For example, a three-phase or single-phase commercial power supply at 50 Hz or 60 Hz is employed as the power supply 11. The load 12 is an apparatus installed in a consumer and consuming power from a system connected to the power supply 11.

The first serial transformer 13 is a transformer connected in series to the system. That is, the first serial transformer 13 has a primary side connected in series between the power supply 11 and the load 12. The parallel transformer 14 is a transformer connected in parallel to the system. That is, the parallel transformer 14 has a primary side connected in parallel between the power supply 11 and the load 12.

The second serial transformer 21 is a transformer having a primary side connected in series between a secondary side of the first serial transformer 13 and a secondary side of the parallel transformer 14. The first AC/DC converter 22 is an AC/DC converter having an AC terminal 22a connected to the secondary side of the second serial transformer 21.

Figure 2:
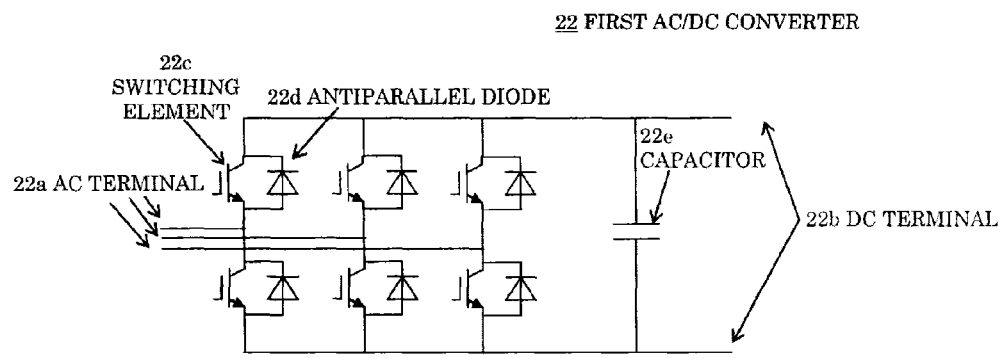
FIG. 2 is a configuration diagram illustrating a first AC/DC converter of the first embodiment.

FIG. 2 illustrates a circuit configuration example of a three-phase AC/DC converter as the first AC/DC converter 22. The first AC/DC converter 22 has a switching element 22c, an antiparallel diode 22d and a capacitor 22e connected between the AC terminal 22a and a DC terminal 22b.

The switching element 22c is a semiconductor device having self arc-extinguishing capability. For example, an IGBT, a MOSFET, a GTO and the like can be used as the switching element 22c. The antiparallel diode 22d is a diode connected in parallel to the switching element 22c and returning an electric current of an inductor immediately after switching of a switch.

The switching elements 22c are provided at least in a pair in each phase, and the AC terminal 22a is connected between the pair of switching elements 22c in each phase. An opposite end of the switching element 22c in each phase is connected to the DC terminal 22b.

The capacitor 22e is an electric energy storage element connected in parallel to the DC terminal 22b. The capacitor 22e needs to maintain a certain charge, that is, electric energy in order to obtain an output of the first AC/DC converter 22. Methods for obtaining the energy for that purpose include a method of obtaining it from the system and a method of obtaining it from an outside, but the method is not limited to a specific one in this embodiment.

Advantageous Effect

An advantageous effect of this embodiment having the configuration as above is as follows. The first AC/DC converter 22 switches the switching element 22c in accordance with an instruction value of a compensation voltage from a controller or the like and outputs voltage.

Here, assuming that the compensation voltage is Vc, an output voltage of the parallel transformer 14 is Vtr, a system line voltage is Vs, and a system load capacity is Ps, the voltage output by the first AC/DC converter 22 may be Vc−Vtr. Thus, the output Pc of the first AC/DC converter 22 is expressed as follows:

$$P_c = \frac{|V_c - V_{tr}|}{V_s} P_s$$

By setting Vtr=Vc/2, for example, the output Pc of the first AC/DC converter 22 is as follows:

$$P_c = \frac{|V_c|}{2V_s} P_s$$

Therefore, according to this embodiment, the output of the first AC/DC converter 22 can be reduced to a half of that of the conventional method. Thus, reduction in loss and size, simplification, and cost reduction of the voltage adjusting apparatus 100 can be made possible.

Moreover, in this embodiment, the second serial transformer 21 is added to the conventional method. However, the power supply 11 at a high voltage and the second serial transformer 21 are insulated. Thus, a transformer with a relatively low withstanding voltage can be used as the second serial transformer 21, and a cost rise and a size increase can be suppressed.

Second Embodiment

Configuration

Figure 3:
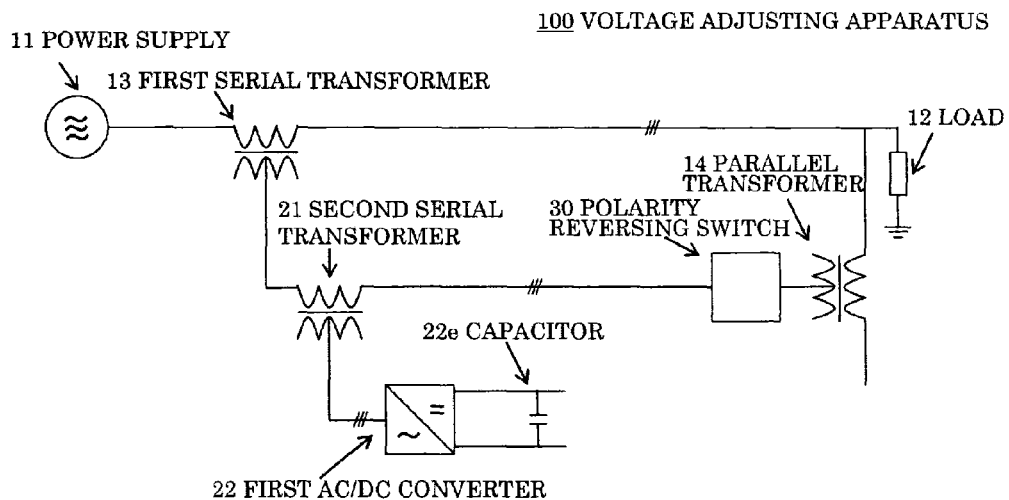
FIG. 3 is a configuration diagram illustrating a voltage adjusting apparatus of a second embodiment.

A configuration of this embodiment will be described with reference to FIGS. 3, 4, and 5. This embodiment has basically the same configuration as that of the above-described first embodiment. However, in this embodiment, a polarity reversing switch 30 is provided as illustrated in FIG. 3. The polarity reversing switch 30 is a switch for reversing the polarity of the voltage between the terminals.

The polarity reversing switch 30 is connected in series between the primary side of the second serial transformer 21 and the secondary side of the parallel transformer 14. This polarity reversing switch 30 is constituted by a semiconductor device.

An example of such polarity reversing switch 30 will be described with reference to FIG. 4. FIG. 4 illustrates a circuit configuration of one phase. AC switches (a) to (d) bridge-connected between an AC terminal (1) and an AC terminal (2) are provided. Each of the AC switches (a) to (d) has a pair of the switching element and the antiparallel diode connected in parallel so that a direction of the electric current becomes opposite.

Figure 4:
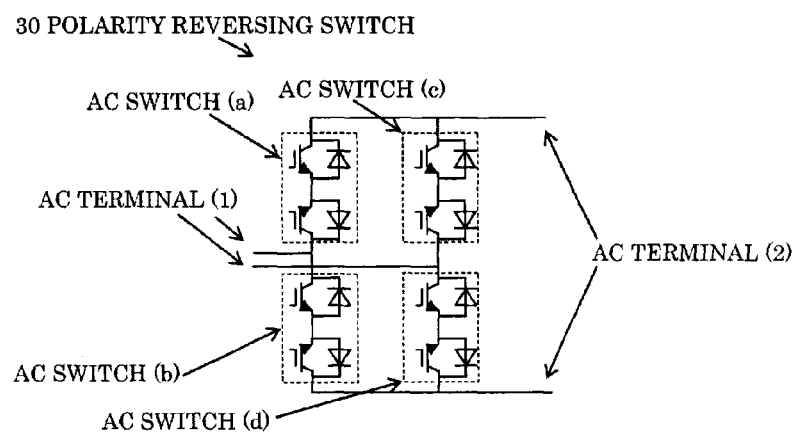
FIG. 4 is a configuration diagram illustrating a polarity reversing switch of the second embodiment.

In FIG. 4, an IGBT is used as the switching element of the AC switches (a) to (d) as an example. However, any other self arc-extinguishing semiconductor devices can be also employed. Moreover, the switching element can be also realized by an AC switch in which a thyristor is connected in an antiparallel manner and by any other types of semiconductor devices.

Figure 5:
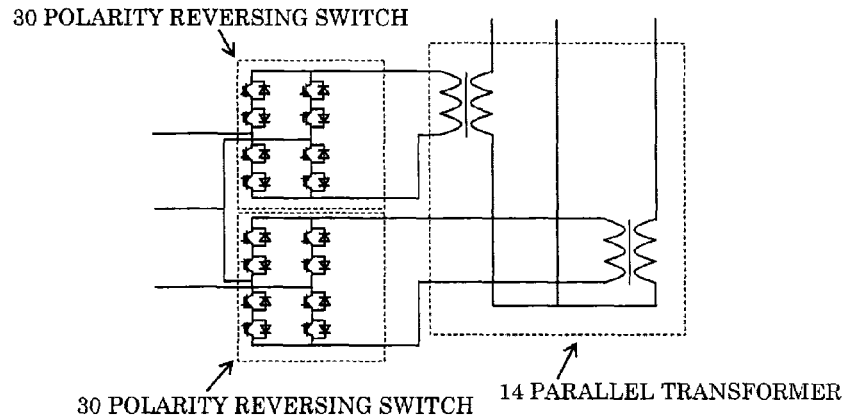
FIG. 5 is a connection diagram of the polarity reversing switch of the second embodiment and a parallel transformer.

An example of a connection diagram of the polarity reversing switch 30 and the parallel transformer 14 is illustrated in FIG. 5. In FIG. 5, a V-connection transformer with an open secondary side is used as the parallel transformer 14. In this example, two units of the polarity reversing switches 30 are connected to the secondary side of the parallel transformer 14.

Advantageous Effect

An advantageous effect of this embodiment as above is as follows. Note that the basic advantageous effect is similar to that of the above-described first embodiment.

First, a polarity reversing operation by the polarity reversing switch 30 will be described. By turning on the AC switch (a) and the AC switch (d) and by turning off the AC switch (b) and the AC switch (c), the polarities of the voltages of the AC terminal (1) and the AC terminal (2) become the same. By turning off the AC switch (a) and the AC switch (d) and by turning on the AC switch (b) and the AC switch (c), the polarities of the voltages of the AC terminal (1) and the AC terminal (2) are reversed.

In the first embodiment, the output voltage of the parallel transformer 14 is +Vtr only. On the other hand, in this embodiment, by combining the parallel transformer 14 and the polarity reversing switch 30, the output voltage becomes ±Vtr. If the compensation voltage is −Vc, assuming that the output voltage of the parallel transformer 14 is Vtr, the system line voltage is Vs, and the system load capacity is Ps, the voltage output by the first AC/DC converter 22 can be −Vc+Vtr and thus, the output Pc of the first AC/DC converter 22 is expressed as follows:

$$P_c = \frac{|-V_c + V_{tr}|}{V_s} P_s$$

By setting Vtr=Vc/2, for example, the output Pc of the first AC/DC converter 22 is as follows:

$$P_c = \frac{V_c}{2V_s} P_s$$

Therefore, even if the compensation voltage is −Vc, the output of the first AC/DC converter 22 can be reduced to a half of that of the conventional method. Thus, reduction in loss and size, simplification, and cost reduction of the voltage adjusting apparatus can be made possible.

Third Embodiment

Figure 6:
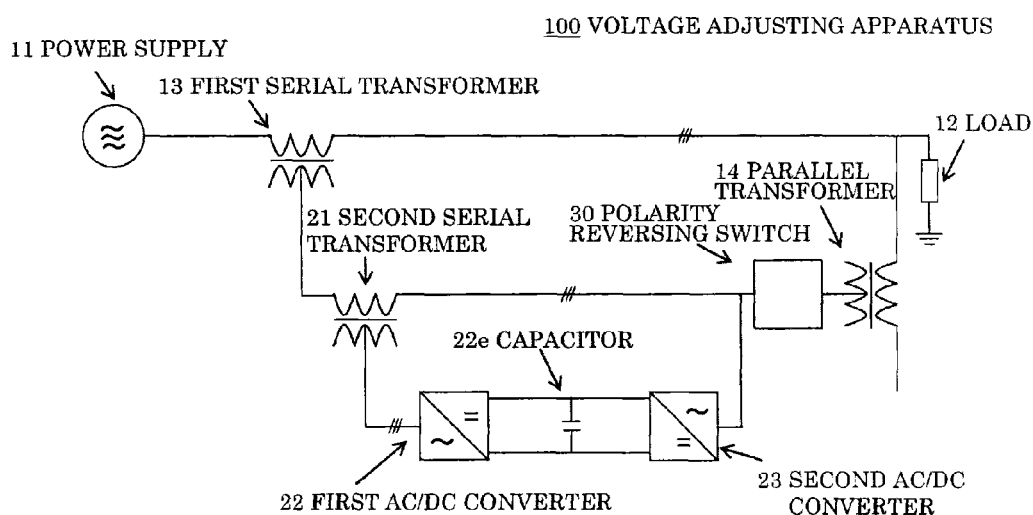
FIG. 6 is a configuration diagram illustrating a voltage adjusting apparatus of a third embodiment.

This embodiment will be described with reference to FIG. 6. This embodiment has basically the same configuration as that of the above-described first embodiment. However, this embodiment is configured such that a DC terminal of a second AC/DC converter 23 is connected to the DC terminal 22b of the first AC/DC converter 22 via the capacitor 22e (see FIG. 2), which is a so-called BTB (Back to Back) configuration.

Then, an AC terminal of the second AC/DC converter 23 is connected in parallel to the secondary side of the parallel transformer 14. Note that, in the example in FIG. 6, the polarity reversing switch 30 is provided similarly to the second embodiment, and the polarity reversing switch 30 is connected between the second AC/DC converter 23 and the parallel transformer 14. However, the polarity reversing switch 30 does not have to be provided as in the first embodiment.

According to this embodiment as above, energy can be acquired from the system without requiring an external power supply for maintaining electric energy storage of the capacitor 22e of the first AC/DC converter 22. Thus, the first AC/DC converter 22 can freely output a voltage of an active component and a voltage of an reactive component.

Fourth Embodiment

Configuration

Figure 7:
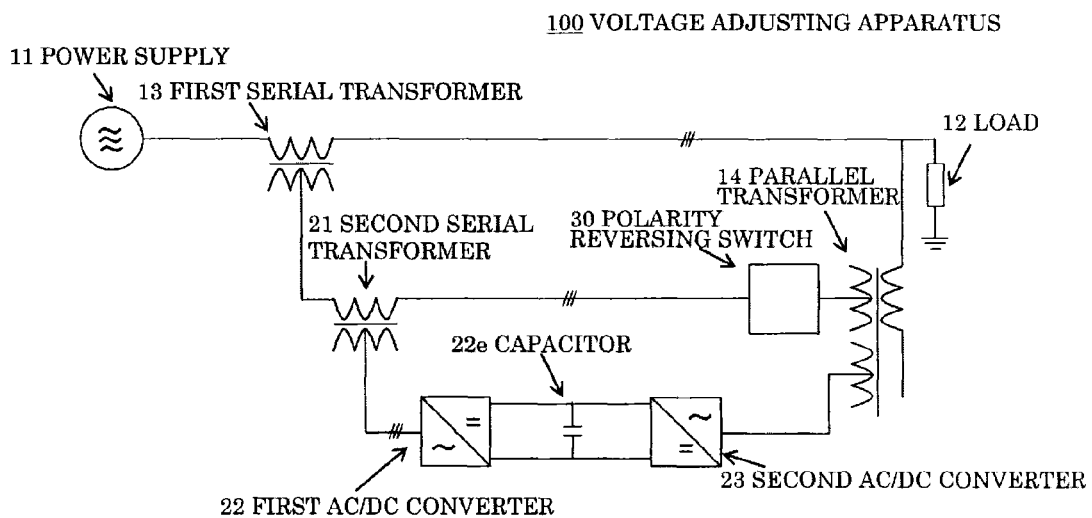
FIG. 7 is a configuration diagram illustrating a voltage adjusting apparatus of a fourth embodiment.

A configuration of this embodiment will be described with reference to FIGS. 7 and 8. This embodiment has basically the same configuration as that of the above-described second embodiment. However, in this embodiment, the parallel transformer 14 is a transformer having a third winding. The parallel transformer 14 has its secondary winding connected to the polarity reversing switch 30 and the third winding connected to the AC terminal of the second AC/DC converter 23.

Advantageous Effect

In this embodiment as above, the polarity reversing switch 30 is made to function as a short-circuit switch. For example, as illustrated in FIG. 4, by turning on the AC switch (a) and the AC switch (c) and by turning off the AC switch (b) and the AC switch (d) or by turning off the AC switch (a) and the AC switch (c) and by turning on the AC switch (b) and the AC switch (d), the AC terminal (1) can be short-circuited. By means of such short-circuit, the compensation voltage can be made 0 even if the output is 0.

Even at short-circuit, the second AC/DC converter 23 is connected to the third winding of the parallel transformer 14 and thus, energy can be acquired from the system. Note that, by configuring this embodiment similarly to the above-described third embodiment, the polarity reversing switch 30 may be made to function as a short-circuit switch.

Figure 8:
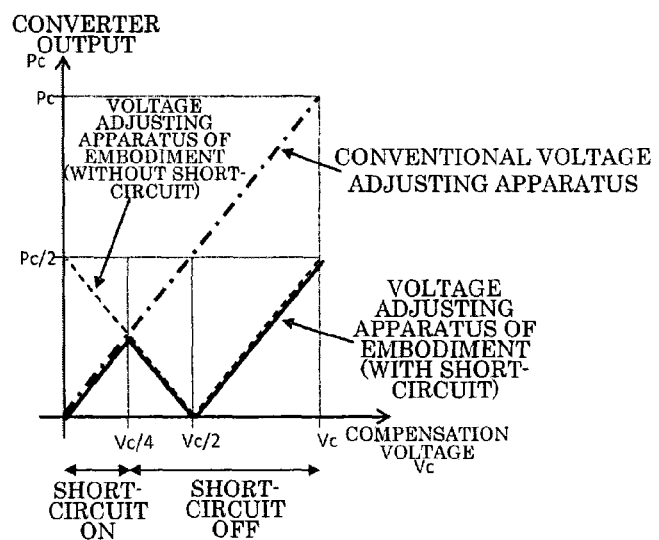
FIG. 8 is an explanatory diagram illustrating a relation between a compensation voltage and a converter output.

FIG. 8 illustrates a relation between the compensation voltage Vc and the output Pc of the first AC/DC converter 22 in this embodiment in which a short-circuit state is made to occur and the embodiment in which a short-circuit state is not made to occur. In the figure, a one-dot chain line indicates a conventional example, a solid line indicates this embodiment, and a dotted line indicates an embodiment without short-circuit. The output voltage of the parallel transformer 14 is set to Vtr=Vc/2. When the compensation voltage is Vc/4 or less, by generating the short-circuit state (short-circuit ON), the output of the first AC/DC converter 22 can be reduced. That is, it is no longer necessary to output a voltage for cancelling the voltage output in order to acquire 0 of the compensation voltage.

Fifth Embodiment

Figure 9:
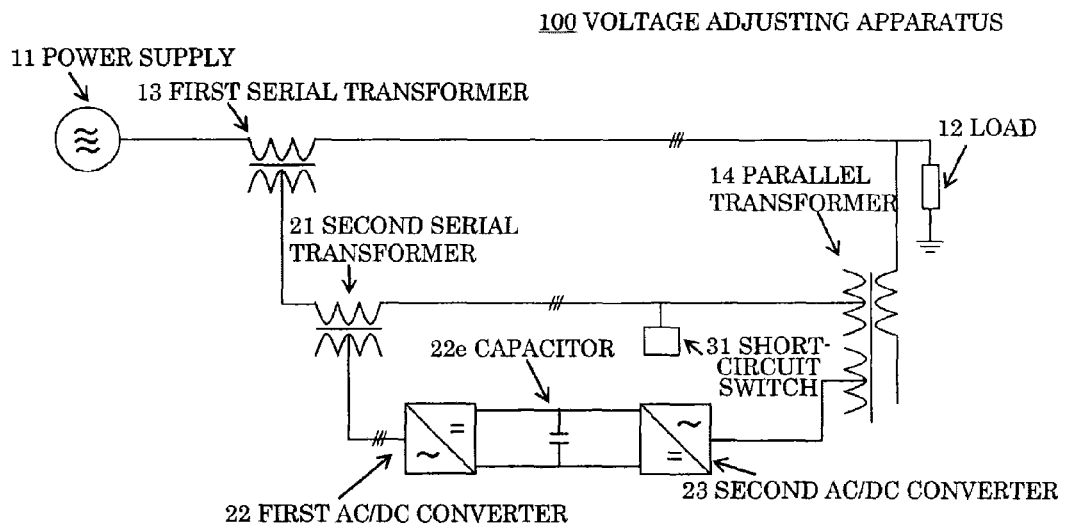
FIG. 9 is a configuration diagram illustrating a voltage adjusting apparatus of a fifth embodiment.

A configuration of this embodiment will be described with reference to FIGS. 9 and 10. This embodiment has basically the same configuration as that of the above-described first embodiment. However, in this embodiment, an inter-phase short-circuit switch 31 is connected between the second serial transformer 21 and the parallel transformer 14. Moreover, the parallel transformer 14 is a transformer having a third winding. Note that the parallel transformer 14 has its secondary winding connected to the short-circuit switch 31 and the third winding connected to the AC terminal of the second AC/DC converter 23.

Figure 10:
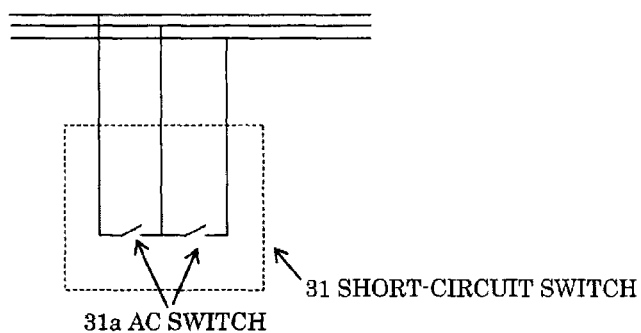
FIG. 10 is a configuration diagram illustrating a short-circuiting switch of the fifth embodiment.

FIG. 10 illustrates the short-circuit switch 31 having an inter-phase AC switch 31a in a case of three-phase. Examples of the AC switch 31a include a mechanical switch, a self arc-extinguishing semiconductor device such as an IGBT, a bilateral semiconductor switch using a thyristor and the like.

According to this embodiment as above, a short-circuit state can be generated by closing the AC switch 31a similarly to the fourth embodiment and thus, an output of the first AC/DC converter 22 can be reduced.

Sixth Embodiment

Figure 11:
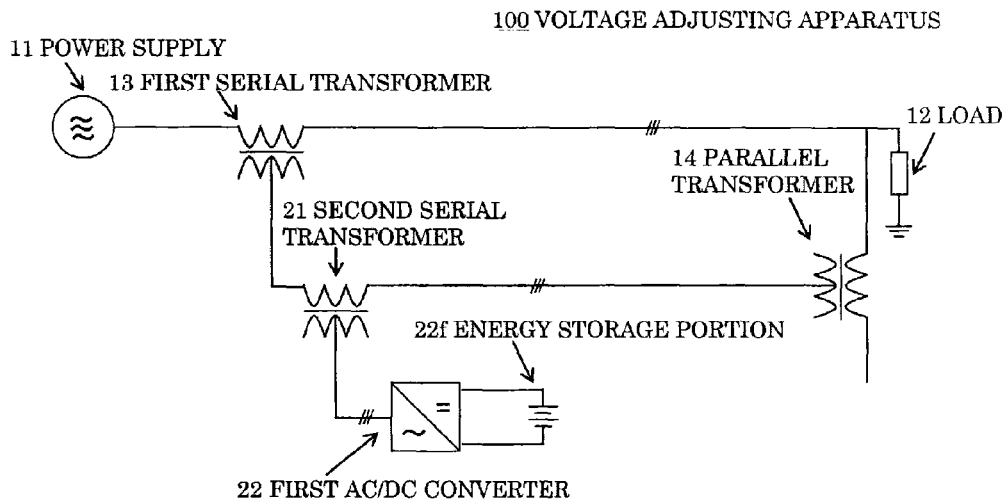
FIG. 11 is a configuration diagram illustrating a voltage adjusting apparatus of a sixth embodiment.
Figure 12:
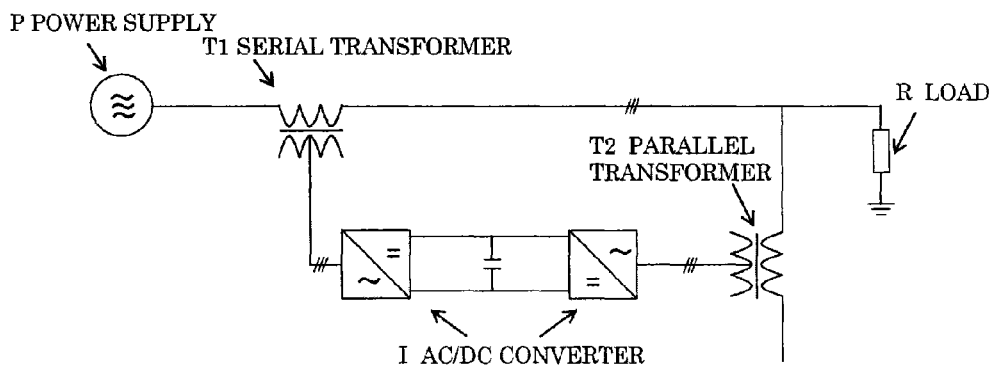
FIG. 12 is a configuration diagram illustrating a conventional voltage adjusting apparatus.

This embodiment will be described with reference to FIG. 11. This embodiment has basically the same configuration as that of the above-described first embodiment. However, in this embodiment, an energy storage portion 22f is connected to the DC terminal 22b of the first AC/DC converter 22.

Examples of the energy storage portion 22f include a battery and a storage apparatus of an electric double-layer capacitor (EDLC).

According to this embodiment, even if the power supply 11 of the system is lost, the first AC/DC converter 22 can freely output a voltage of an effective component and a voltage of an ineffective component. Note that this energy storage portion 22f may be configured to be charged or to store power from the system by being connected to the parallel transformer 14 via the second AC/DC converter 23 as in the above-described embodiment.

Other Embodiments

The embodiment of the present invention is not limited to the above aspects. For example, the primary side, the secondary side, and the third side of the above-described various transformers are merely numbered such that the side which is the closest to the system is the primary side for convenience so that each of the windings can be distinguished. Thus, the primary side, the secondary side, and the third side do not have to match the primary side, the secondary side, and the third side determined by rating of the transformer or the like.

Moreover, as the winding configurations of the above-described serial transformer and parallel transformer, application of delta connection, Y-connection, V-connection or single-phase connection can be applied. The advantageous effect of each of the above-described embodiments holds true even if the power supply and the load are switched at system switching.

Several embodiments of the present disclosure were explained in this specification, but those embodiments are merely presented as examples, and are not intended to limit the scope and spirit of the present disclosure. The above-explained embodiments can be carried out in various other forms, and permit various omissions, replacements, and modifications without departing from the scope and spirit of the present disclosure. Such embodiments and modifications thereof are within the scope and spirit of the present disclosure, and also within an equivalent range to the subject matter as recited in appended claims.

What is claimed is:

1. A voltage adjusting apparatus comprising:
   a second serial transformer having a primary side connected in series to a secondary side of a first serial transformer having a primary side connected in series between a power supply and a load and to a secondary side of a parallel transformer having a primary side connected in parallel between the power supply and the load; and
   an AC/DC converter having an AC side connected to a secondary side of the second serial transformer.

2. The voltage adjusting apparatus according to claim 1, wherein
   a polarity reversing switch is connected between the primary side of the second serial transformer and the secondary side of the parallel transformer.

3. The voltage adjusting apparatus according to claim 1, further comprising:
   a second AC/DC converter having a DC side connected to a DC side of the AC/DC converter and an AC side connected to the secondary side or a third side of the parallel transformer.

4. The voltage adjusting apparatus according to claim 1, wherein
   an inter-phase short-circuit switch is connected between the primary side of the second serial transformer and the secondary side of the parallel transformer.

5. The voltage adjusting apparatus according to claim 4, wherein
   the short-circuit switch is a polarity reversing switch.

6. The voltage adjusting apparatus according to claim 1, wherein
   an energy storage portion is connected to the DC side of the AC/DC converter.

7. The voltage adjusting apparatus according to claim 2, wherein
   the polarity reversing switch uses a self arc-extinguishing device or a thyristor as a semiconductor device.

8. The voltage adjusting apparatus according to claim 2, further comprising:
   a second AC/DC converter having a DC side connected to a DC side of the AC/DC converter and an AC side connected to the secondary side or a third side of the parallel transformer.

* * * * *